United States Patent [19]

Light

[11] Patent Number: 5,170,521
[45] Date of Patent: Dec. 15, 1992

[54] PORTABLE SLEEPER FOR A LAND VEHICLE

[76] Inventor: Robert W. Light, 30 Osage Ct., Oswego, Ill. 60543

[21] Appl. No.: 898,544

[22] Filed: Jun. 15, 1992

[51] Int. Cl.$^5$ .......................... A45F 3/22; A47C 19/22
[52] U.S. Cl. .......................................... 5/118; 5/119; 5/122; 5/191; 296/190
[58] Field of Search .................. 5/118, 119, 120, 122, 5/191; 296/190, 100; 160/327; 114/192; 244/118.6

[56] References Cited

U.S. PATENT DOCUMENTS

| | | | |
|---|---|---|---|
| 1,420,80 | 6/1922 | Wise | 5/118 |
| 980,829 | 1/1911 | Palm et al. | 5/191 |
| 1,242,960 | 10/1917 | McIntosh | 5/191 |
| 2,703,412 | 3/1955 | Stone | 5/191 |
| 3,524,673 | 8/1970 | Cramer et al. | 5/118 |
| 4,221,424 | 9/1980 | Eiserman et al. | 5/118 |
| 4,739,528 | 4/1988 | Allen | 5/119 |

FOREIGN PATENT DOCUMENTS 768501  8/1934  France ................................. 5/191

*Primary Examiner*—Alexander Grosz

[57] ABSTRACT

A portable sleeper is provided for a truck and comprises at least four anchors connected to the posts at the four corners of the cab or to the bed of a pickup truck. A flexible generally rectangular flat, webbed support surface is connected at its four corners to the anchors by means of a belt buckle coupling so that the portable sleeper can be selectively tensioned into a taut support surface on which the user of the vehicle may recline.

10 Claims, 3 Drawing Sheets

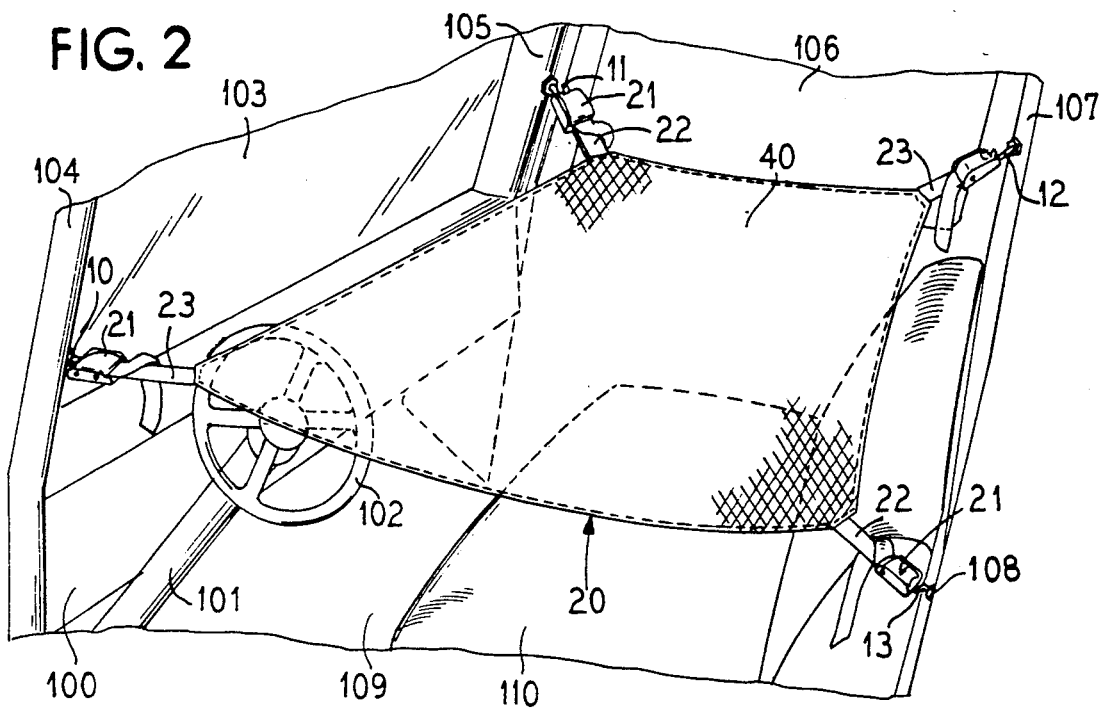
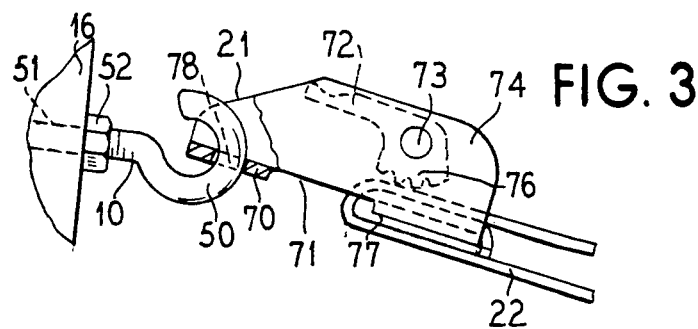
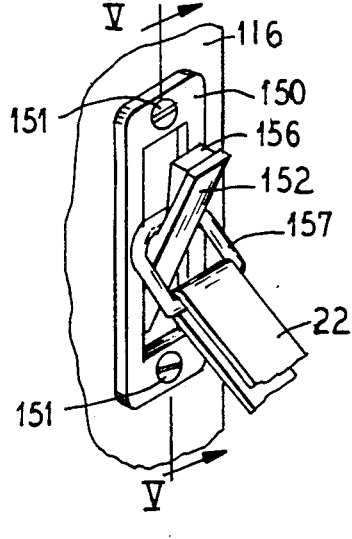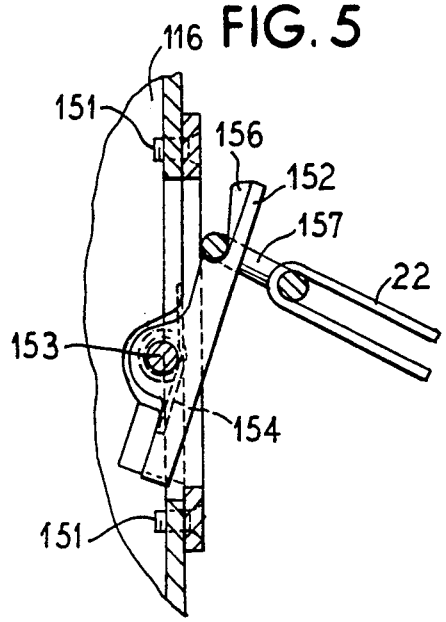

PORTABLE SLEEPER FOR A LAND VEHICLE

BACKGROUND OF THE INVENTION

1. Field of the Invention

This invention relates generally to a portable sleeper for a land vehicle and more specifically to a portable sleeper which can be selectively utilized in the cab of a truck tractor or in the bed of a pickup truck.

2. Description of the Prior Art

The truck tractors of interstate transport vehicles are oftentimes constructed in such a manner as to provide a cab which provides a one-man sleeper. However, there are times when a driving team gets into a situation where the team has to wait a day or more for a load and if both members of the driving team want to sleep, no facilities are available.

Hammock constructions have been provided heretofore which constitute a kind of a hanging bed or couch made of canvas, netted cord or the like and such hammocks are usually suspended at longitudinally spaced points to a stanchion or other means of support. However, such hammock constructions are not readily adaptable for use with land vehicles because they are relatively pendulous in nature and do not offer the provision of a support surface which is suitable for the vehicle user.

SUMMARY OF THE INVENTION

In accordance with the present invention, a portable sleeper is provided which includes a generally rectangular frame or support member adapted to be connected at its four corners to anchors which may be connected to the interior of a truck tractor cab or to the bed of a pickup truck.

Adjustable coupling means are located between each of the anchors and the support member to adjustably tension the support member, thereby to form a taut support surface within the interior of the truck cab or superjacent the bed of the pickup truck, on which the user of the vehicle may recline.

DESCRIPTION OF THE DRAWINGS

FIG. 2 is a view showing the portable sleeper of the present invention installed in the cab of a truck tractor land vehicle;

FIG. 3 is an enlarged fragmentary view showing one form of anchoring and coupling means utilized in accordance with the principles of the present invention;

FIG. 4 is a view of an alternative anchoring and coupling means which can be provided in accordance with the principles of the present invention;

FIG. 5 is a fragmentary view generally in cross-section and taken on the plane of line V—V of FIG. 4;

DESCRIPTION OF THE PREFERRED EMBODIMENTS

The problem of providing a support surface on which truck drivers and truck users may recline is an acute problem since long hours behind the wheel tend to aggravate back problems and short periods of horizontal rest are extremely advantageous for over-the-road drivers.

Truck drivers desiring to take a fast nap or truck drivers having to wait at truck docks either to load or unload cannot rest satisfactorily by merely slumping over a steering wheel to sleep. Accordingly, under the those conditions or in the event a truck driver is waiting for road service, it would be particularly advantageous to have a portable sleeper providing a support surface capable of affording an adequate horizontal support surface on which to recline.

Figure 1:
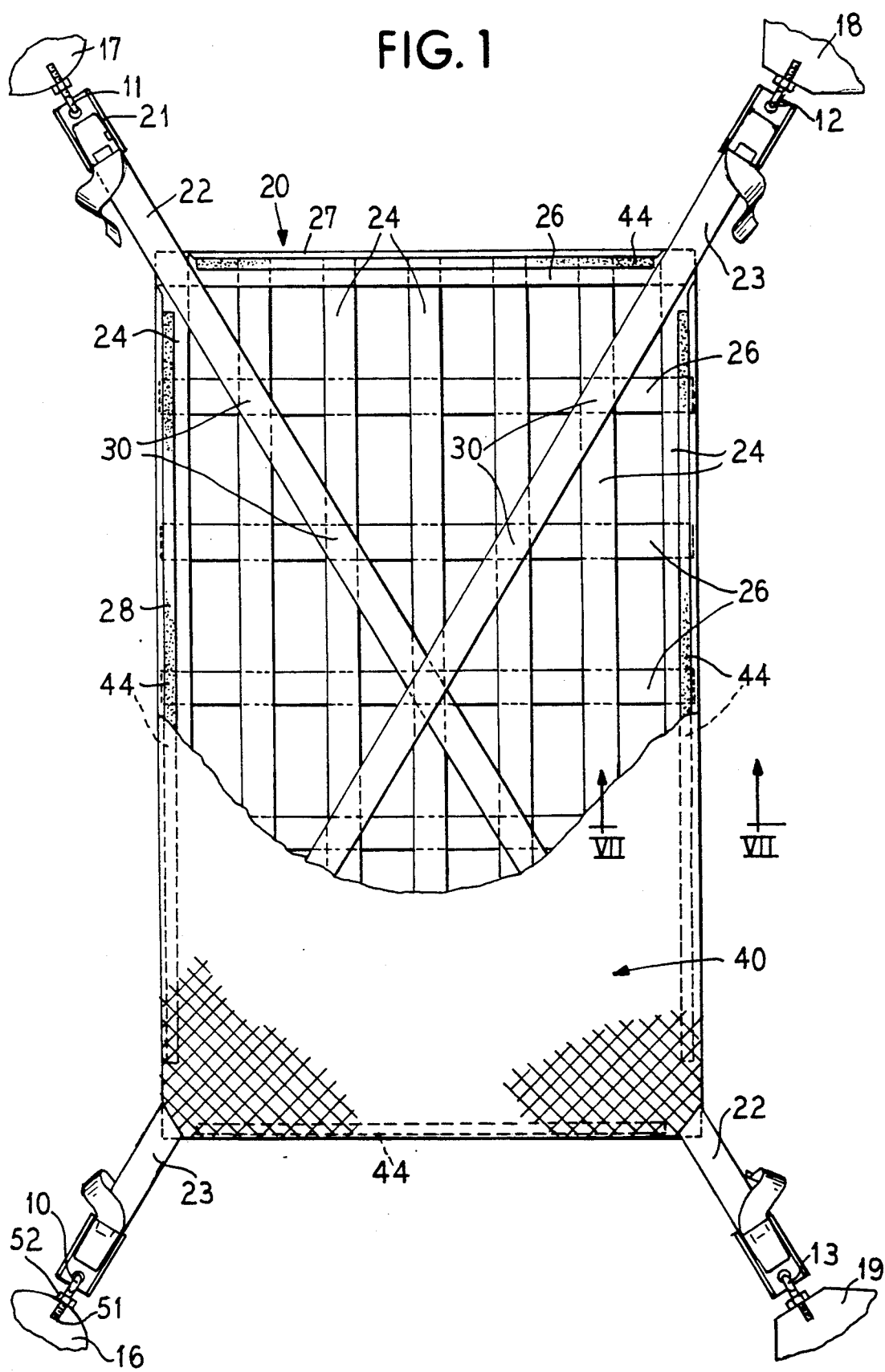
FIG. 1 is a plan elevational view with parts broken away to show additional details of construction of a portable sleeper embodying the principles of the present invention.

The present invention provides such a portable sleeper for use in a truck. Referring to FIG. 1, it is contemplated that there be provided at least four anchors 10, 11, 12 and 13 which can be connected to four corresponding points of support within a land vehicle shown at 16, 17, 18 and 19. The points of support 16, 17, 18, 19 are spaced longitudinally and laterally and are disposed in a common plane.

A flexible generally rectangular flat webbed support member is adapted to be connected at its four corners to the anchors 10-13. In FIG. 1, the support member is shown generally at the reference 20. Adjustable coupling means 21 are connected between each of the anchors 10-13 and the support member 20 to adjustably tension the support member 20, thereby to form a taut support surface within the interior of the truck cab or within the confines of a truck bed, if the land vehicle is a pickup truck and on which the user of the vehicle may recline.

More specifically, the support member 20 comprises a pair of cross straps 22 and 23 disposed in the shape of an X-configured cross.

A second set of longitudinal straps is shown at 24 and a third set of lateral straps is shown at 26. The straps 24 and 26 is disposed longitudinally and laterally in a generally rectangular array.

Figure 7:
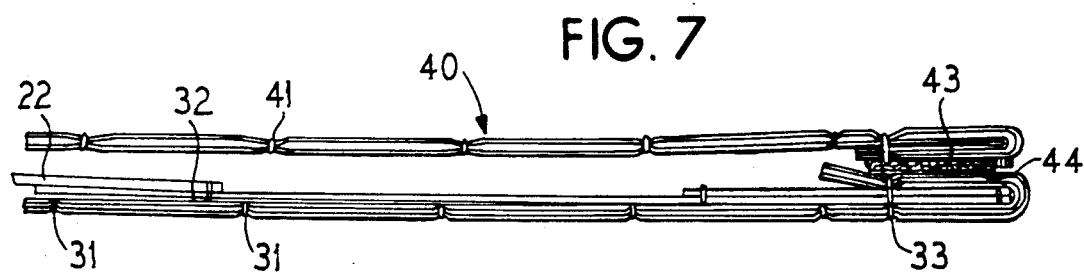
FIG. 7 is a fragmentary cross-sectional view taken generally on the plane of line VII—VII of FIG. 1.

A fourth set of peripheral straps is shown at 27 for the ends and at 28 for the sides. The end straps 27 and the side straps 28 are each connected to the ends of each of the second and third sets of straps 24 and 26. It will be noted that the cross straps 22 and 23 and the second and third sets of straps 24 and 26 are disposed so that there is substantial overlapping at the respective joints indicated by the reference numeral 30. Referring particularly to FIG. 7 in conjunction with FIG. 1, it will be noted that each of the longitudinally extending straps 24 is stitched as at 31 to the adjoining lateral strap 26 and each of the cross straps 22 and 23 is connected by stitching as at 32 to the adjoining one of the longitudinal and lateral straps 24 and 26.

At the peripheral edges, the parts are stitched as at 33 so that the entire support member 20 is completely integrated as a unitary construction with the straps 22, 23, 24, 26, 27 and 28 completely integrated with one another.

In order to provide a continuous surface extending longitudinally and transversely over the framework provided by the strapping, a sheet form cover member is shown generally at 40 and comprises upper and lower facings made of suitable material such as plastic and which may be quilted as at 41, thereby to form a continuous surface extending longitudinally and transversely over the webbing straps of the framework and extending between the peripheral header straps over the frame.

Hook and eye fastening means commercially available under the trademark VELCRO ® may be connected to the peripheral edges of the framework and to the cover member so that the cover member 40 may be selectively removed for cleaning and/or laundering. Strips of VELCRO ® brand fasteners are shown at 43 and 44 and cooperate with one another to securely fasten the cover member 40 in place, but permit selective removal.

It is contemplated by the present invention that various forms of coupling means and anchoring means may be provided between the land vehicle and the portable sleeper.

In the form of the invention shown in FIG. 1, 2 and 3, it is contemplated that each of the anchoring means 10, 11, 12 and 13 comprise a hook 50 at one end and a threaded stud 51 at the opposite end. A tapped opening is formed in an adjacent support surface of the land vehicle so that the threaded stud 51 may be threaded thereinto whereupon a lock nut 52 will securely fasten the anchor 10-13 in place. Like reference numerals may be used to identify like parts in each of the anchors 10-13 inclusive.

It is contemplated by the present invention that different forms of belt and buckle means may be provided to connect the cross straps 22 and 23 to the anchor means. Thus, in the form of the invention illustrated in FIGS. 1, 2 and 3, the belt and buckle means comprises a buckle coupling 21 having a body portion 70 in which is formed an opening 71 through which a cross strap 22 (or 23) may be threaded and reversely turned back upon itself.

A moveable tongue 72 is pivotally moveable about an axle 73 supported by a pair of spaced upright side flanges 74. The moveable tongue 72 forms a lever and has a locking portion 76 on which is formed a plurality of teeth 77. When the tongue is lifted, the strap 22 may be relatively moved through the opening 71. However, when the tongue 72 is depressed, the teeth 77 and the locking portion 76 engage against the strap 22 and lock the strap in place. Thus, the buckle 21 may be used to selectively lock the strap 22 in different positions of tensioned adjustment.

The buckle 21 is also provided with a second opening 78 through which the hook 50 of the anchor 10 is received.

Referring now to FIG. 2, the interior cab of a truck tractor transport is depicted having a dashboard 100, a steering column 101 and a steering wheel 102. The windshield is shown at 103 and has a support post 104 at one side of the windshield and a support post 105 at the opposite side of the windshield. One of the side windows or doors is shown at 106 and an additional support post at the edge of the door is shown at 107. A corresponding support point 108 is located at the opposite side of the cab. The floor board is illustrated at 109 and the seat of the vehicle is shown at 110.

In this form of the invention, the anchor means 10-13 inclusive are disposed in a common plane. Thus, the anchor 10 is screwed into the post 104 while the anchor 11 is screwed into the post 105. The anchors 12 and 13 are screwed into the rear support points 107 and 108. Each of the support points is disposed in the same plane so that the corresponding buckle couplings may be engaged with the hook portions 50 of the anchor means thereby suspending the portable sleeper in a horizontal disposition somewhat above the level of the steering wheel 102.

The free ends of the cross straps 22 and 23 are pulled tightly so that the support member 20 is tautly tensioned and a good tight horizontal support surface is provided which extends across the internal dimensions of the cab and on which the user of the land vehicle may comfortably recline.

An alternative form of coupling and anchoring means is illustrated in FIGS. 4 and 5. In this form of the invention, a bracket is shown at 150 and is fastened to an adjoining portion of the vehicle 116 by a fastening means such as a screw 151 located at both the top and the bottom of the bracket 150. A retractable tongue 152 is pivotally hinged on an axle 153 carried by the bracket 150 and a torsion spring 154 normally biases the tongue 152 into a closed position within the bracket 150. However, by pushing the bottom of the tongue 152 inwardly against the bias of the spring 154, a hook portion 156 on the end of the tongue is exposed. Such hook can then be used to capture an appropriate coupling member such as the coupling member 21. However, in the alternative structure shown in FIGS. 4 and 5, the hook cooperates with a bail 157 through which the end of the strap 22 is threaded. It will be understood that the strap 22 can then be associated with some other form of buckling means such as will be described hereinafter, or for that matter, with a buckle means such as that already described in connection with the buckle 21.

Figure 6:
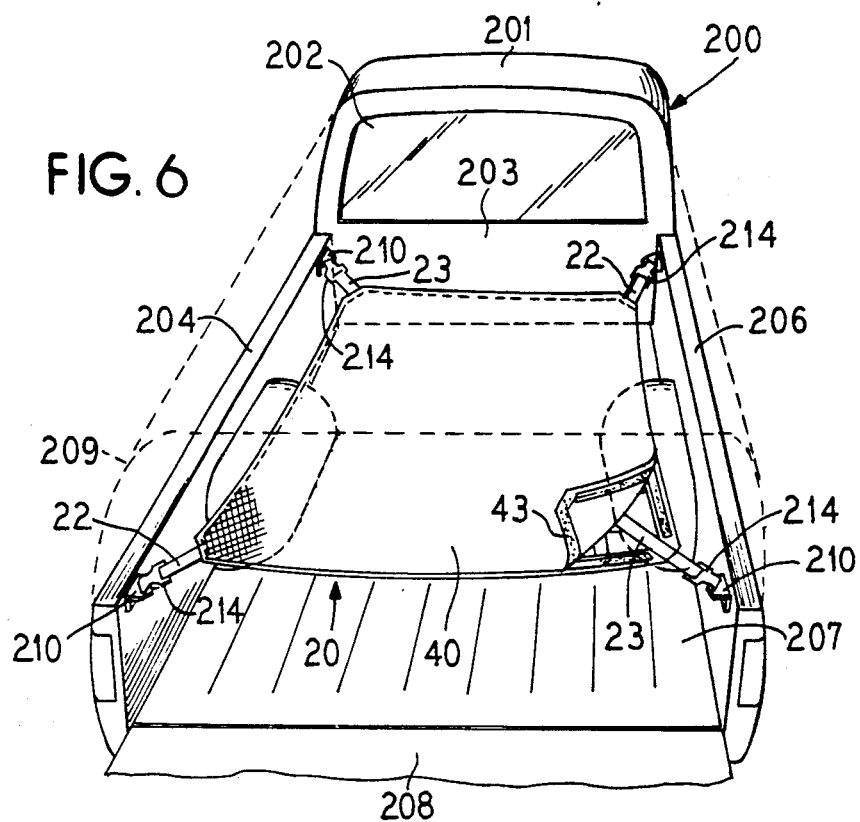
FIG. 6 is a view showing the portable sleeper of the present invention installed in the bed of a pickup truck.

Referring now to FIG. 6, there is shown a pickup truck 200 having a cab 201 with a rear window 202 disposed in a wall 203 of the cab. The pickup truck includes a bed shown generally as extending rearwardly from the wall 203 and the bed includes sidewalls 204 and 206 on opposite sides of the truck, the floor of the bed being shown at 207. A tailgate is shown at 208.

Optionally, the rear of the truck may be enclosed as shown in dashed lines at 209 or the dashed lines 209 may represent a cover or enclosure which is placed over the bed of the pickup truck 200.

Figure 8:
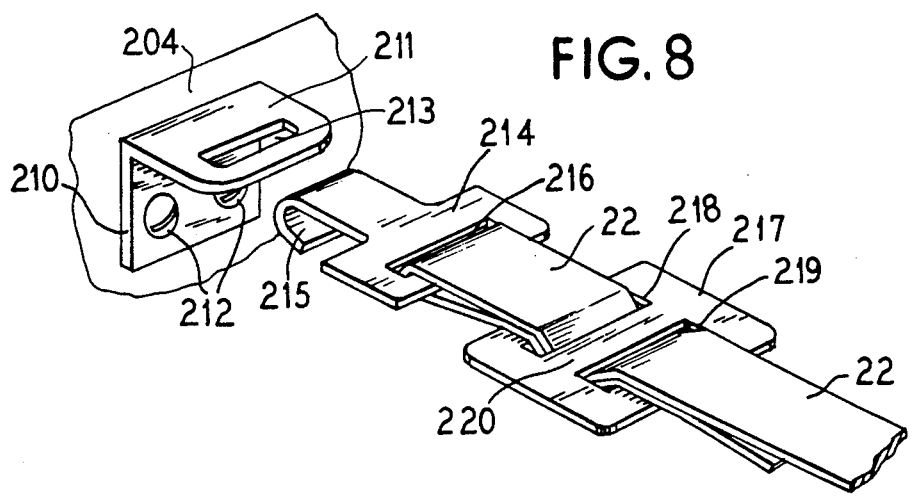
FIG. 8 is an exploded view showing yet another form of coupling means and anchoring means for connecting the portable sleeper of the present invention to the support services of a land vehicle.

In accordance with the principles of the present invention, at least four anchor means are disposed in a common plane and are connected to the walls 204 and 206 in a common plane. The particular form of anchoring means illustrated in FIG. 6 is shown in greater detail in FIG. 8. Thus, it will be noted that the anchor comprises an L-shaped bracket having a vertical leg 210 and a horizontal leg 211. The vertical leg has two openings therein through which fastener screws 212 may be extended thereby to connect the L-shaped bracket to the wall 204 or 206 of the pickup truck. The horizontal leg 211 has a slotted opening 213 formed therein. A hook member is shown at 214 and includes a hook portion 215 which fits through the slot 213 thereby engaging the hook member 214 in selectively removable assembly with the L-shaped bracket 210,211. The body member of the hook 214 has an opening 216 through which the end of the strap 22 or 23 is threaded.

A clasp member is shown at 217 and has two openings 218 and 219 formed therein, the openings being separated by a cross piece 220. The clasp member 217 is spaced adjacent the hook member 214. Thus, when both portions of the strap 22 are threaded through the respective openings 218 and 219 and the reversely turned free end is likewise passed through both openings, the strap 22 may be selectively tightened and locked in place.

It will be noted that the portable sleeper 20 is effectively suspended in a taut tensioned state superjacent the floor 207 of the bed of the pickup truck 200 thereby affording a good surface upon which the user of the vehicle may recline.

Although minor modifications might be suggested by those versed in the art, it should be understood that I wish to embody within the scope of the patent warranted hereon all such modifications as reasonably and properly come within the scope of my contribution to the art.

I claim as my invention:

1. In a land vehicle having a space characterized by at least four points of support spaced longitudinally and laterally with respect to one another;
   the improvement of a portable, flexible and foldable sleeper comprising;
   a plurality of belt-like webbing straps extending longitudinally;
   a plurality of belt-like webbing straps extending transversely;
   peripheral header straps connecting each and all of said other straps at opposite ends thereof to form a generally rectangular flexible support frame;
   two cross straps each extending lengthwise and widthwise from corner to corner of said frame and being connected to said longitudinal and transverse straps with the respective opposite ends of said cross straps projecting beyond the respective corners of said support frame;
   connecting means between each cross strap and a corresponding adjoining point of support in said land vehicle; and
   a sheet form member forming a continuous surface extending longitudinally and transversely over said webbing straps of said frame and extending between said peripheral header straps over said frame;
thereby to form a portable sleeper on which a person may recline.

2. The invention as defined in claim 1 wherein said connecting means comprise belt and buckle means for selectively tensioning the cross strap with which it is associated.

3. The invention of claim 1 wherein said land vehicle comprises a truck having a cab providing said space characterized by at least four points of support disposed as set forth in a common plane, thereby to suspend the portable sleeper within the interior of the cab of the truck.

4. The invention of claim 1 and further characterized by said land vehicle comprising a truck having a load receiving bed providing said space characterized by at least four points of support disposed as set forth in a common plane, thereby to suspend the portable sleeper above the load receiving bed of the truck.

5. The invention of claim 1 and further characterized by said sheet form member and said header straps having VELCRO ® fastening means to removably connect said sheet form member to said frame for selective cleaning and laundering.

6. A portable vehicular sleeper comprising a plurality of web-like straps disposed in an array to form a flat flexible and foldable support surface and more particularly comprising a first pair of cross straps disposed in the shape of an X-shaped cross;
   each of said cross straps having a buckle coupling fixed in the end thereof and formed with a moveable tongue to selectively fasten on a reversely turned portion of the same cross strap, thereby to selectively foreshorten the cross strap and increase the tension on the cross strap;
   a second set and a third set of straps disposed longitudinally and disposed laterally in a generally rectangular array; and
   a fourth set of peripheral straps connected to the ends of each of the second and third set of straps,
      said first pair of cross straps being connected to the straps immediately adjacent thereto;
   thereby to form said support surface;
      anchor means adapted to be integrally connected to spaced points in a land vehicle and to which each respective one of said buckle couplings may be connected;
whereby said support surface may be selectively disposed within the land vehicle for the convenience of the user.

7. A portable vehicular sleeper as defined in claim 6 wherein said anchor means comprises a hook having a screw threaded shank threadable into the adjoining support portion of a land vehicle.

8. A portable vehicular sleeper as defined in claim 6 wherein said anchor means comprises a bracket attachable to a land vehicle and having a spring biased tongue forming a retractable hook, whereby said tongue is selectively exposed for attachment to said coupling means.

9. A portable vehicular sleeper as defined in claim 6 wherein said anchor means comprises a rigid bail loop through which a corresponding cross strap is threaded, thereby to form a connecting member for connection to a corresponding anchor means.

10. A portable vehicular sleeper as defined in claim 6 wherein said anchor means comprises an L-shaped bracket having a vertical leg for attachment to an adjoining wall of the vehicle and a horizontal leg formed with an opening to receive a coupling means.

* * * * *